United States Patent
Uno

(10) Patent No.: US 7,836,075 B2
(45) Date of Patent: Nov. 16, 2010

(54) COMMUNICATION SYSTEM AND NETWORK STORAGE DEVICE THEREFOR

(75) Inventor: Fumitoshi Uno, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 302 days.

(21) Appl. No.: 11/902,999

(22) Filed: Sep. 27, 2007

(65) Prior Publication Data

US 2008/0082558 A1    Apr. 3, 2008

(30) Foreign Application Priority Data

Sep. 29, 2006    (JP)    ............................. 2006-268944

(51) Int. Cl.
*G06F 7/00* (2006.01)
(52) U.S. Cl. ...................... 707/770; 707/771; 707/795; 707/796; 358/1.15; 358/1.16
(58) Field of Classification Search ................... 707/10, 707/100–102, 104.1, 770, 771, 795, 796; 358/1.15, 1.16
See application file for complete search history.

(56) References Cited

U.S. PATENT DOCUMENTS

| | | | | |
|---|---|---|---|---|
| 5,559,933 | A * | 9/1996 | Boswell ..................... | 358/1.15 |
| 6,219,669 | B1 * | 4/2001 | Haff et al. ..................... | 707/10 |
| 6,292,267 | B1 * | 9/2001 | Mori et al. ................. | 358/1.15 |
| 6,442,571 | B1 * | 8/2002 | Haff et al. ................... | 707/201 |
| 6,611,348 | B1 * | 8/2003 | Chase et al. .............. | 358/1.15 |
| 6,611,349 | B1 * | 8/2003 | Vogt et al. ................. | 358/1.15 |
| 6,738,155 | B1 * | 5/2004 | Rosenlund et al. ......... | 358/1.15 |
| 6,961,726 | B1 * | 11/2005 | Eisenberg et al. ............. | 707/10 |
| 7,017,144 | B2 * | 3/2006 | Cohen et al. ................. | 717/100 |

(Continued)

FOREIGN PATENT DOCUMENTS

EP    0 860 986 B1 *    2/1998

(Continued)

OTHER PUBLICATIONS

Knut Stolze—"Still Image Extensions in Database Systems—A Product Overview" -Datenbank—Specktrum, Feb. 2002 (pp. 40-47 or 1-8).*

(Continued)

*Primary Examiner*—Jean B. Fleurantin
*Assistant Examiner*—Anh Ly
(74) *Attorney, Agent, or Firm*—Scully, Scott, Murphy & Presser, P.C.

(57) ABSTRACT

A communication system includes a host device and a network storage device interconnected via a network. The host device includes a data file request command issuing unit issuing a data file request command a data file receiving unit receiving a requested data file, a data file storing unit storing the requested data file, an attribute file request command issuing unit issuing an attribute file request command, an attribute file receiving unit receiving a requested attribute file, and an attribute updating unit updating attribute information of the requested data file with an original attribute information included in the attribute file. The network storage device includes a data file sending unit sending the data file to the host device, an attribute file creating unit creating the attribute file, and an attribute file sending unit sending the created attribute file to the host device.

10 Claims, 10 Drawing Sheets

U.S. PATENT DOCUMENTS

| | | | |
|---|---|---|---|
| 7,268,904 B2* | 9/2007 | Matsumoto | 358/1.15 |
| 7,313,579 B2* | 12/2007 | Murotani | 707/204 |
| 2002/0054397 A1* | 5/2002 | Matsushima | 358/524 |
| 2002/0087474 A1 | 7/2002 | Suga | |
| 2002/0176109 A1* | 11/2002 | Matsumoto | 358/1.15 |
| 2003/0115314 A1* | 6/2003 | Kawashima | 709/224 |
| 2003/0233363 A1* | 12/2003 | Cohen et al. | 707/100 |
| 2004/0056903 A1* | 3/2004 | Sakai | 345/853 |
| 2005/0023339 A1 | 2/2005 | Uno | |
| 2005/0120359 A1* | 6/2005 | Shoji et al. | 719/321 |
| 2005/0138081 A1* | 6/2005 | Alshab et al. | 707/200 |
| 2005/0210032 A1* | 9/2005 | Machida | 707/10 |
| 2006/0020636 A1* | 1/2006 | Murotani | 707/200 |
| 2006/0055962 A1* | 3/2006 | Saito | 358/1.15 |
| 2006/0092468 A1* | 5/2006 | Matsushima | 358/1.15 |
| 2006/0103881 A1* | 5/2006 | Matsuda | 358/1.15 |
| 2006/0173913 A1* | 8/2006 | Aoyama | 707/104.1 |
| 2007/0041042 A1* | 2/2007 | Tamai et al. | 358/1.15 |

FOREIGN PATENT DOCUMENTS

| | | |
|---|---|---|
| JP | 05-079650 | 10/1993 |
| JP | 8-030557 A | 2/1996 |
| JP | 2000-207268 | 7/2000 |
| JP | 2002-007772 | 1/2002 |
| JP | 2003-177987 | 6/2003 |
| JP | 2005-18645 | 1/2005 |
| JP | 2005-107875 | 4/2005 |

OTHER PUBLICATIONS

Nakawatase, et al., "Cipherfile Sharing System with Cryptosystem and Digital Signature (Angou, denshi-shoumei-wo mochiita fairu-kyoyu sisutemu-ni-tsuite)" —Research Report from Information Processing Society of Japan (IPSJ), Nov. 27, 1998, issue No. 108 in vol. 98, pp. 13-18.

Sakaki, M. et al., "Frequent Topics in Network (Nettowaaku-no yoku-aru hanashi)—Windows 2000 Magazine No. 5" Ascii Media Works, Apr. 1, 2001, No. 5, pp. 55-58.

Japanese Notification of Reasons of Rejection, w. English translation thereof, issued in Japanese Patent Application No. JP 2006-268944 dated Dec. 19, 2008.

Partial English Translation of Sakaki, M. et al., "Frequent Topics in Network (Nettowaaku-no yoku-aru hanashi)—Windows 2000 Magazine No. 5" Ascii Media Works, Apr. 1, 2001, No. 5, pp. 55-58.

Japanese Notification of Reasons of Rejection, w/ English translation thereof, issued in Patent Application No. JP 2006-268944 dated on Aug. 20, 2008.

* cited by examiner

COMMUNICATION SYSTEM AND NETWORK STORAGE DEVICE THEREFOR

CROSS-REFERENCE TO RELATED APPLICATION

This application claims priority under 35 U.S.C. §119 from Japanese Patent Application No. 2006-268944 filed on Sep. 29, 2006. The entire subject matter of the application is incorporated herein by reference.

BACKGROUND

1. Technical Field

The following description relates to one or more FTP communication systems with a network storage device connected to a host device such as a personal computer and workstation.

2. Related Art

Recently, there is widely known as an example of a recording medium a so-called memory card configured with a non-volatile memory, such as a flash memory, being packaged in a card form. The memory card is rapidly spreading as a data recording medium usable for a digital device such as a digital camera and portable music player. A format of the memory card is not unified, and there come in a market various formats of memory cards, such as CompactFlash (trademark registered, hereinafter, simply referred to as "CF"), SmartMedia (trademark registered, hereinafter, simply referred to as "SM"), Memory Stick (trademark registered, hereinafter, simply referred to as "MS"), and SD Memory Card (trademark registered, hereinafter, simply referred to as "SD").

It is possible to access data stored on the aforementioned memory card from a personal computer (PC) using a memory card reader/writer (an example of a network storage device, hereinafter, simply referred to as "reader/writer") which is configured to read data from the memory card and write data into the memory card in a state connected with the PC. Thereby, data communication between the PC and memory card becomes possible (for example, see Japanese Patent Provisional Publications No. 2005-18645 and No. 2005-107875). In these years, a printer with such a reader/writer incorporated therein has come to be widely used. Thereby, an image can directly be printed with the memory card storing thereon a JPEG format file of the image being inserted in the reader/writer without using the PC.

The aforementioned printer can be configured as a network printer connectable with a plurality of PCs via a network so as to be commonly used by the plurality of PCs. In this case, the network printer and the PCs are generally interconnected via a TCP/IP (Transmission Control Protocol/Internet Protocol) network (e.g., Local Area Network). Further, when the memory card, which is to be used for storing thereon an image data file taken by the digital camera or the mobile phone with the digital camera, is inserted in the reader/writer of the network printer, the network printer with an FTP (File Transfer Protocol) server program installed therein can transfer the image data file to the PCs based on the FTP. Namely, the reader/writer of the printer is usable as an external network storage device of the PC.

However, when there is performed the FTP-based data communication between the PC and the aforementioned network reader/writer (or the printer with the reader/writer) provided with an FTP server function, attribute information of the data file might be changed into information different from original one stored in a transfer source. For instance, after the data file with an attribute thereof originally set to be "READ ONLY" is transferred from the PC and stored into the reader/writer (or, transferred from the reader/writer and stored into the PC), the attribute might be changed into one which represents that both "READ/WRITE" operations are possible.

Further, date information (or date and time information) stored as a part of the attribute information that represents a creation date (or update date) of the data file might be changed into date information that represents date when the data file has been transferred (especially in the case of file transfer from the PC to the reader/writer). It is a serious problem that the attribute information and/or date information are lost as described above in the case of a data file with important attribute information and/or date information included therein, such as a data file with attribute information intentionally set to be "READ ONLY" to prevent careless data rewriting, a time series data file with information representing a state of frequently updated data at each update time, and an image data file with information representing a date when the image data file was taken by a digital camera.

The aforementioned problem is caused for a following reason. Since the FTP, which is an old protocol in a communication protocol history, is designed based on an assumption that an FTP server is provided with a UNIX-based file system (UNIX: trademark registered), commands of the file system for acquiring and updating the attribute information of the data file do not comply with a file attribute format for a file system provided to the PC with Windows (trademark registered) installed as an OS (Operating System) therein.

SUMMARY

Aspects of the present invention are advantageous in that there can be provided one or more improved communication systems and network storage devices employed therefor that make it possible to save original attribute information of a data file stored in a source device even in a destination device to which the data file is transferred from the source device based on the FTP.

According to aspects of the present invention, there is provided a communication system, which includes a network, a host device connected with the network, and a network storage device connected with the network, the network storage device performing data communication with the host device via the network. The host device includes a data file request command issuing unit configured to issue, to the network storage device, a data file request command for requesting a data file stored in the network storage device, a data file receiving unit configured to receive the requested data file to be sent from the network storage device, a data file storing unit configured to store the requested data file received by the data file receiving unit, an attribute file request command issuing unit configured to issue, to the network storage device, an attribute file request command for requesting an attribute file including original attribute information of the requested data file in response to the requested data file being stored in the data file storing unit, an attribute file receiving unit configured to receive the attribute file to be sent from the network storage device, and an attribute updating unit configured to update attribute information of the requested data file stored in the data file storing unit with the original attribute information included in the attribute file received by the attribute file receiving unit. The network storage device includes a data file sending unit configured to read out the data file requested with the data file request command and send the requested data file to the host device, in response to the data file request command issued by the data file request command issuing unit, an attribute file creating unit configured to read out the original attribute information from the requested data file stored in the network storage device and create the attribute file including the original attribute information, in response to the attribute file request command issued by the attribute file request command issuing unit, and an attribute file sending unit configured to send the attribute file created by the attribute file creating unit to the host device.

According to the above configuration, the host device provisionally stores the requested data file received from the network storage device in the data file storing unit thereof, and later receives the attribute file created by the attribute file creating unit of the network storage device that includes the original attribute information of the requested data file, updating (provisional) attribute information of the requested data file as stored with the original attribute information. Therefore, even if compatibility of commands for acquiring or updating attribute information of a data file attribute is not ensured between a file system employed by the network storage device and a file system of an OS installed in the host device, it is possible to save original attribute information of the data file stored in the network storage device in the host device.

According to another aspect of the present invention, there is provided a communication system, which includes a network, a host device connected with the network, and a network storage device connected with the network, the network storage device performing data communication with the host device via the network. The host device includes, a storage unit, a data file transfer command issuing unit configured to issue, to the network storage device, a data file transfer command specifying a transferred data file stored in the storage unit, a data file sending unit configured to read out, from the storage unit, the transferred data file specified by the data file transfer command and send the transferred data file to the network storage device, in response to the data file transfer command being issued by the data file transfer command issuing unit, an attribute file transfer command issuing unit configured to issue, to the network storage device, an attribute file transfer command for sending an attribute file including original attribute information of the transferred data file in response to the transferred data file being sent by the data file sending unit, an attribute file creating unit configured to read out the original attribute information from the transferred data file stored in the storage unit and create the attribute file including the original attribute information, in response to the attribute file transfer command being issued by the attribute file transfer command issuing unit, and an attribute file sending unit configured to send the attribute file created by the attribute file creating unit to the network storage device. The network storage device includes a data file receiving unit configured to receive the transferred data file sent by the data file sending unit, a data file storing unit configured to store the transferred data file received by the data file receiving unit, an attribute file receiving unit configured to receive the attribute file sent by the attribute file sending unit, and an attribute updating unit configured to update attribute information of the transferred data file stored in the data file storing unit with the original attribute information included in the attribute file received by the attribute file receiving unit.

According to the above configuration, the network storage device provisionally stores the transferred data file received from the host device in the data file storing unit thereof, and later receives the attribute file created by the attribute file creating unit of the host device that includes the original attribute information of the transferred data file, updating (provisional) attribute information of the transferred data file as stored with the original attribute information. Therefore, even if compatibility of commands for acquiring or updating attribute information of a data file attribute is not ensured between a file system employed by the network storage device and a file system of an OS installed in the host device, it is possible to save original attribute information of the data file stored at the host device side in the network storage device.

According to a further aspect of the present invention, there is provided a network storage device configured to perform data communication with a host device via a network, which includes a data file sending unit configured to read out a requested data file stored in the network storage device and send the requested data file to the host device, in response to a data file request command to be issued by the host device, an attribute file creating unit configured to read out an original attribute information from the requested data file and create an attribute file including the original attribute information, in response to an attribute file request command issued by the host device, and an attribute file sending unit configured to send the attribute file created by the attribute file creating unit to the host device.

According to a further aspect of the present invention, there is provided a network storage device configured to perform data communication with a host device via a network, which includes a data file receiving unit configured to receive a transferred data file to be sent by the host device, a data file storing unit configured to store the transferred data file received by the data file receiving unit, an attribute file receiving unit configured to receive an attribute file to be sent by the host device that includes an original attribute information of the transferred data file, and an attribute updating unit configured to update attribute information of the transferred data file stored in the data file storing unit with the original attribute information included in the attribute file received by the attribute file receiving unit.

According to the network storage device configured as above, the same effects as the aforementioned communication systems can be brought.

BRIEF DESCRIPTION OF THE
ACCOMPANYING DRAWINGS

FIG. 1 schematically shows an overall configuration of a communication system in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
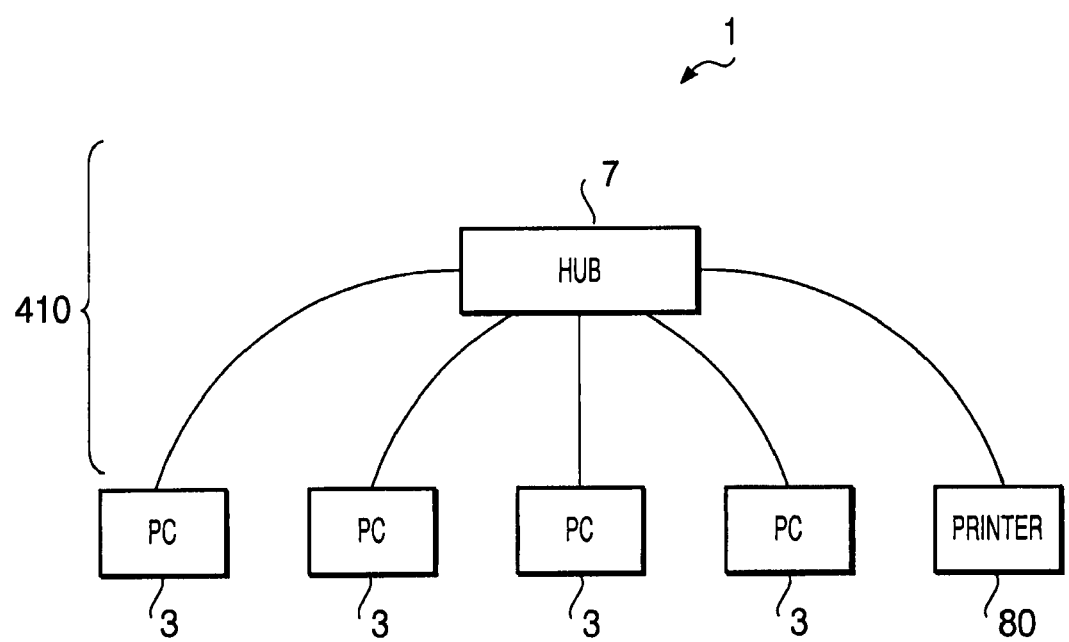

Hereinafter, there will be described with reference to the accompanying drawings an FTP communication system in an embodiment according to aspects of the present invention. FIG. 1 is a block diagram schematically showing a configuration of an FTP communication system 1 in the embodiment. The FTP communication system 1 is configured with a printer 80 and host devices 3 that use the printer 80 as a network printer (personal computer: hereinafter, referred to as PCs 3) being interconnected via a hub 7 on a TCP/IP network 410.

Figure 2:
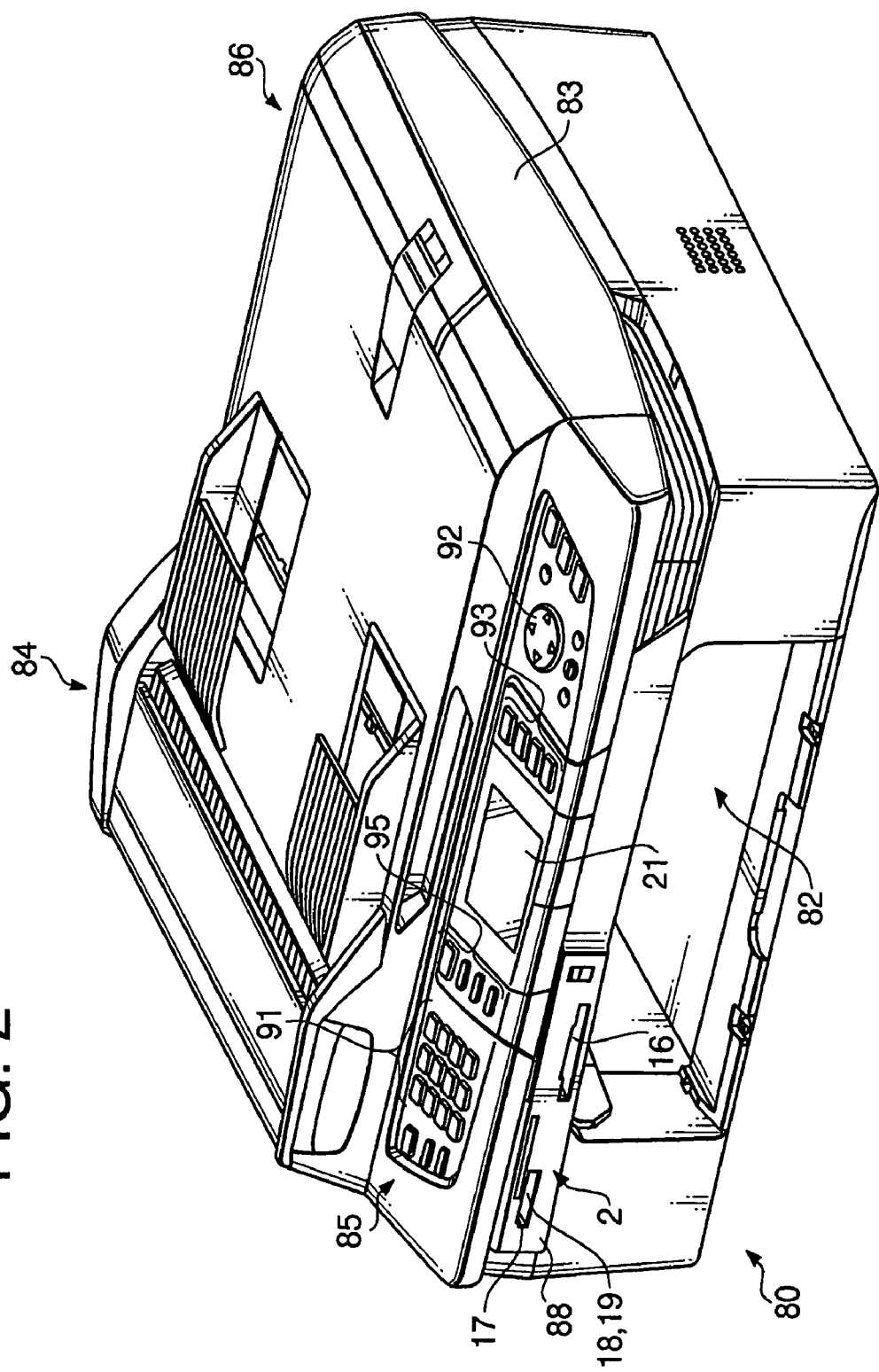
FIG. 2 is a perspective view showing an example of a printer applied to the communication system in accordance with one or more aspects of the present invention.

FIG. 2 schematically shows an external configuration of the printer 80. The printer 80 is configured as a Multi Function Peripheral (MFP) with a multi card reader/writer 2 that serves as a network storage device incorporated therein. Specifically, the printer 80 is integrally provided with a printing unit 82 arranged at a lower portion of a housing, scanner unit 83 arranged at an upper portion of the housing, cover 86 having a document feeder 84, operation panel 85 arranged at a front side on an upper surface of the printer 80, and multi card reader/writer 2 with slots 16 to 19 into which card media are inserted at a front of the printer 80. The printer 80 has a printer function, scanner function, copier function, and facsimile function.

The printer 80 prints an image and/or text onto a paper with the printing unit 82 based on printing data to be transmitted by the PC 3 that include image data and/or text data. In addition, the printing unit 82 can also print an image and/or text onto a paper based on printing data read out from a memory card (removable recording medium) by the multi card reader/writer 2 (direct printing). Further, the printer 80, connected with the PC 3, can serve as a reader/writer device that performs data communication between the PC 3 and a memory card inserted into the multi card reader/writer 2. Additionally, the printer 80 can send data of an image scanned by the scanner unit 83 to the PC 3 and copy the scanned image with the printing unit 82.

As shown in FIG. 2, the multi card reader/writer 2 of the printer 80 is provided with a first slot 16 into which a first memory card 11 is inserted, a second slot 17 into which a second memory card 12 is inserted, a third slot 18 into which a third memory card 13 is inserted, and a fourth slot 19 into which a fourth memory card 14 is inserted. In addition, at a front of the housing, there are provided a liquid crystal display panel (LCD) 21 as a display unit, keyboard 91 including a numeric keypad, and cursor key 92 for controlling a cursor motion on the LCD 21. Furthermore, various menu keys 93 and 95 are arranged at locations adjacent to the LCD 21. The multi card reader/writer 2 is configured as a USB/SCSI type peripheral device.

Figure 3:
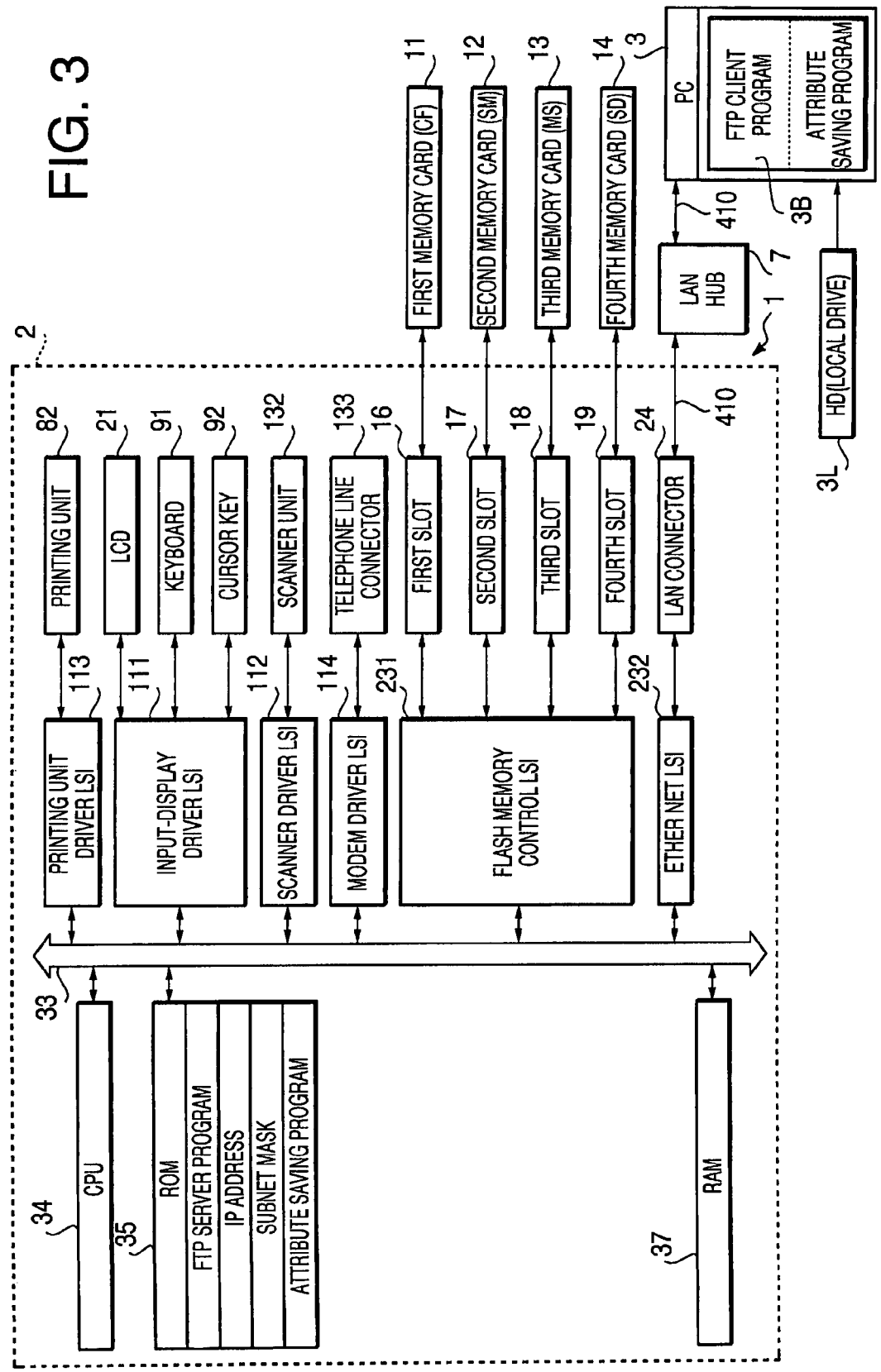
FIG. 3 is a block diagram showing an example of an electrical configuration of the printer in accordance with one or more aspects of the present invention.

FIG. 3 is a block diagram showing an electrical configuration of the printer 80. The multi card reader/writer 2 includes therein a CPU 34 that controls each component, ROM 35 (configured with a non-volatile memory such as a flash memory in the embodiment) which stores therein various control programs and data, and RAM 37 as a work area for an operation by the CPU 34, which are interconnected so as to mutually perform data transmission via a bus 33. Further, the bus 33 is connected with each of the slots 16 to 19 via a flash memory control LSI 231. The first to fourth memory cards 11-14, detachably inserted into the slots 16 to 19, respectively, are card type recording media that include flash memories to which the PC 3 can perform data access such as data writing, data rewriting, data erasing, data reading, and medium loading confirmation. The first to fourth memory cards 11-14 are, for example, CompactFlash (CF: trademark registered, the first memory card 11), SmartMedia (SM: trademark registered, the second memory card 12), Memory Stick (MS: trademark registered, the third memory card), and SD Memory Card (SD: trademark registered, the fourth memory card 14), respectively. It is noted that a miniSD card can also be inserted into the fourth slot 19 for the SD Memory Card with a physical interface adaptor (not shown).

The bus 33 is connected with the printing unit 82 via a printing unit driver LSI 113. Further, the bus 33 is connected with the scanner unit 132 via a scanner driver LSI 112. Additionally, the bus 33 is connected with a modem driver LSI 114, which is linked with telephone line connector 133 to be connected with an external telephone communication network. The bus 33 is connected with the LCD 21, keyboard 91, and cursor key 92 via an input-display LSI 111. Furthermore, the bus 33 is connected with the plurality of PCs 3 as the host devices via an Ethernet (Ethernet: trademark registered) LSI 232, local area network (LAN) connector 24, and the first network 410. The plurality of PCs 3 and the printer 80 are interconnected via the hub 7 on the TCP/IP network 410 (see FIG. 1).

There are stored in the ROM 35 various programs for controlling an operation of the printing unit 82, controlling an operation of the scanner unit 132, controlling facsimile communication via the modem driver LSI 114, controlling an input from an input portion such as the keyboard 91 and cursor key 92 (in addition, the menu keys 93 and 95, and an execution key 94 that are not shown in any drawing), controlling a display output on the LCD 21, and controlling an operation of the multi card reader/writer 2. By running the above programs on the RAM 37 as an execution area, the CPU 34 controls an overall operation of the printer 80 as the MFP. It is noted that the above programs are not shown since they are widely known.

An FTP server program is stored in the ROM 35. Furthermore, there are stored in the ROM 35 an IP address and subnet mask for specifying the printer 80 on the TCP/IP network 410. Meanwhile, there is installed in the PC3 browser software 3B with an FTP client program included therein.

There are inserted into the slots 16 to 19 the memory cards (removable recording media) 11-14 that store therein files for printing, respectively. The slots 16 to 19 are utilized as slots for direct printing to read out the files for printing from the memory cards 11-14, respectively, and to directly perform image printing based on the files for printing with the printing unit 82. For example, in the case of a digital camera or a mobile phone with a digital camera, a picture image taken thereby is stored as a JPEG image file in a specific kind of memory card inserted into a card reader thereof. Then, the memory card is removed and inserted into a corresponding one of the slots 16 to 19 of the printer 80. Thereafter, when an option "direct printing" in a menu is selected on the LCD 21 by operating the keyboard 91, cursor key 92, or menu keys 93 and 95, the direct printing can be performed for a selected picture image file.

In addition, it is possible to perform data access from the PC 3 to the multi card reader/writer 2 via the TCP/IP network with an FTP server program at the side of the printer 80 and an FTP client program at the side of the PC 3. Specifically, when a file request command (GET command) that specifies a file name of an intended data file is issued from the PC 3 (FTP client) to the printer 80 (FTP server), the printer 80 can read out the data file specified by the file name from a memory card inserted in the reader/writer thereof and transfer the data file to the PC 3. Meanwhile, when a file transfer command (PUT command) that specifies a file name of an intended data file is issued from the printer 80 (FTP server) to the PC 3 (FTP client), the printer 80 can read out the data file specified by the file name from a memory card inserted in the reader/writer thereof and transfer the data file to the PC 3. Namely, the multi card reader/writer 2 can be used as an external network storage device of the PC 3. Additionally, the PC 3 (host device) is provided with a local drive 3L such as a hard disk drive that is a storage device incorporated therein or directly connected therewith. The aforementioned data file is stored in the local drive 3L. It is noted that the local drive 3L may be a CD drive, DVD drive, MO drive, flexible disk drive, card reader, and RAM disk.

It is noted that the following description will be made based on an assumption that a Windows-based OS is installed into each of the PCs 3 while a UNIX-based file system is employed by the printer as the FTP server. Accordingly, when FTP transfer of a data file is performed between the printer 80 and PC 3 in a conventional manner, compatibility between before and after acquiring or changing a file attribute cannot be secured. Further, it is assumed that there is not carried out at the PC 3 side acquisition of date and time information of a data file with a LIST command as one of FTP commands.

Consequently, when a data file is transferred from the printer 80 (FTP server) to the PC 3 (FTP client), a requested data file received from the multi card reader/writer 2 (network storage device) is provisionally stored in the local drive 3L with a predetermined format of attribute information 204 added thereto as substitute for an original attribute information 205 of the requested data file stored in the removable recording medium as a transfer source. Meanwhile, when the data file is transferred from the PC 3 (FTP client) to the printer 80 (FTP server), the transferred data file received from the PC 3 (host device) is provisionally stored in the memory card 11-14 in a form with a predetermined format of attribute information 204 added thereto as substitute for an original attribute information 205 of the transferred data file stored in the local drive 3L as a transfer source.

Figure 4:
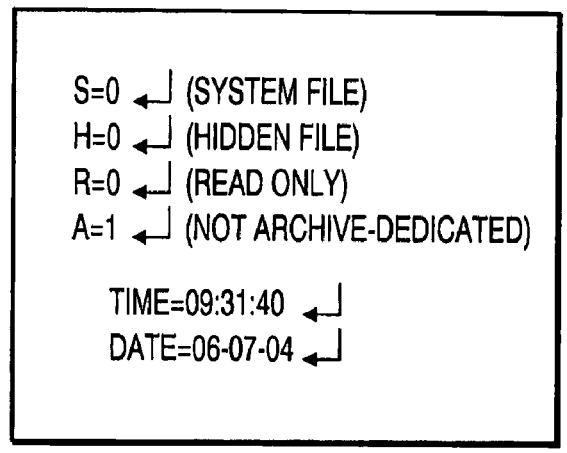
FIG. 4 is an illustration schematically showing attribute information in accordance with one or more aspects of the present invention.

As shown in FIG. 4, the file attribute information includes four pieces of information of S ("0": SYSTEM FILE, "1": NOT SYSTEM FILE), H ("0": HIDDEN FILE, "1": NOT HIDDEN FILE), R ("0": READ ONLY, "1": NOT READ ONLY), A ("0": ARCHIVE-DEDICATED, "1": NOT ARCHIVE-DEDICATED). In addition, the file attribute information includes information on a date and time when the file was created or updated. In the predetermined format of attribute information 204, S=0, H=0, R=0, and A=1. Further, the predetermined format of attribute information 204 includes information on a date and time when the provisional storing operation was performed (namely, the date and time are not the same as original ones at a side of the memory card 11-14 or local drive 3L as a transfer source).

Figure 6:
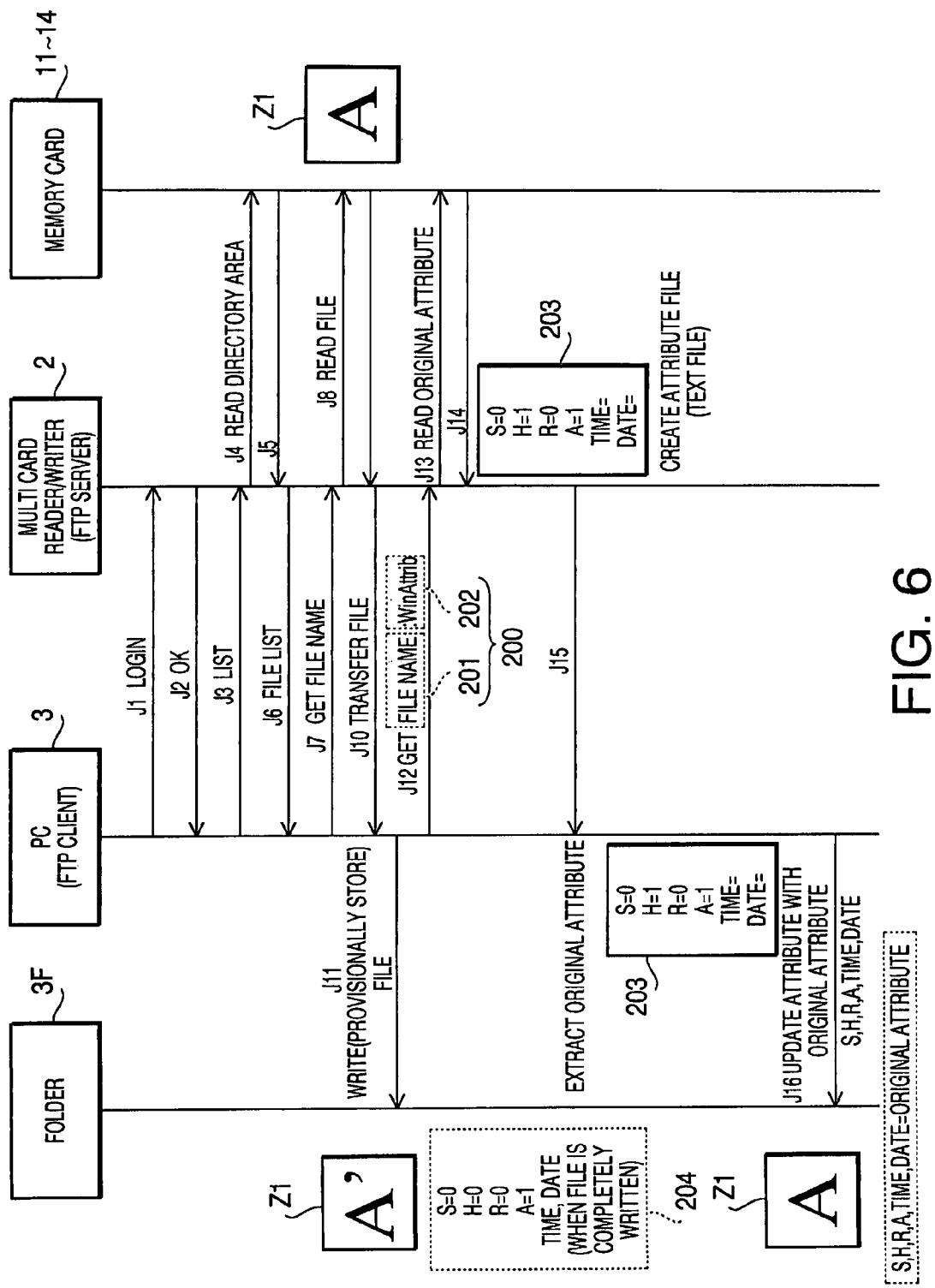
FIG. 6 is a sequence chart schematically showing a procedure of a file transfer process from a PC (FTP client) to a multi card reader/writer (FTP server) in accordance with one or more aspects of the present invention.
Figure 7:
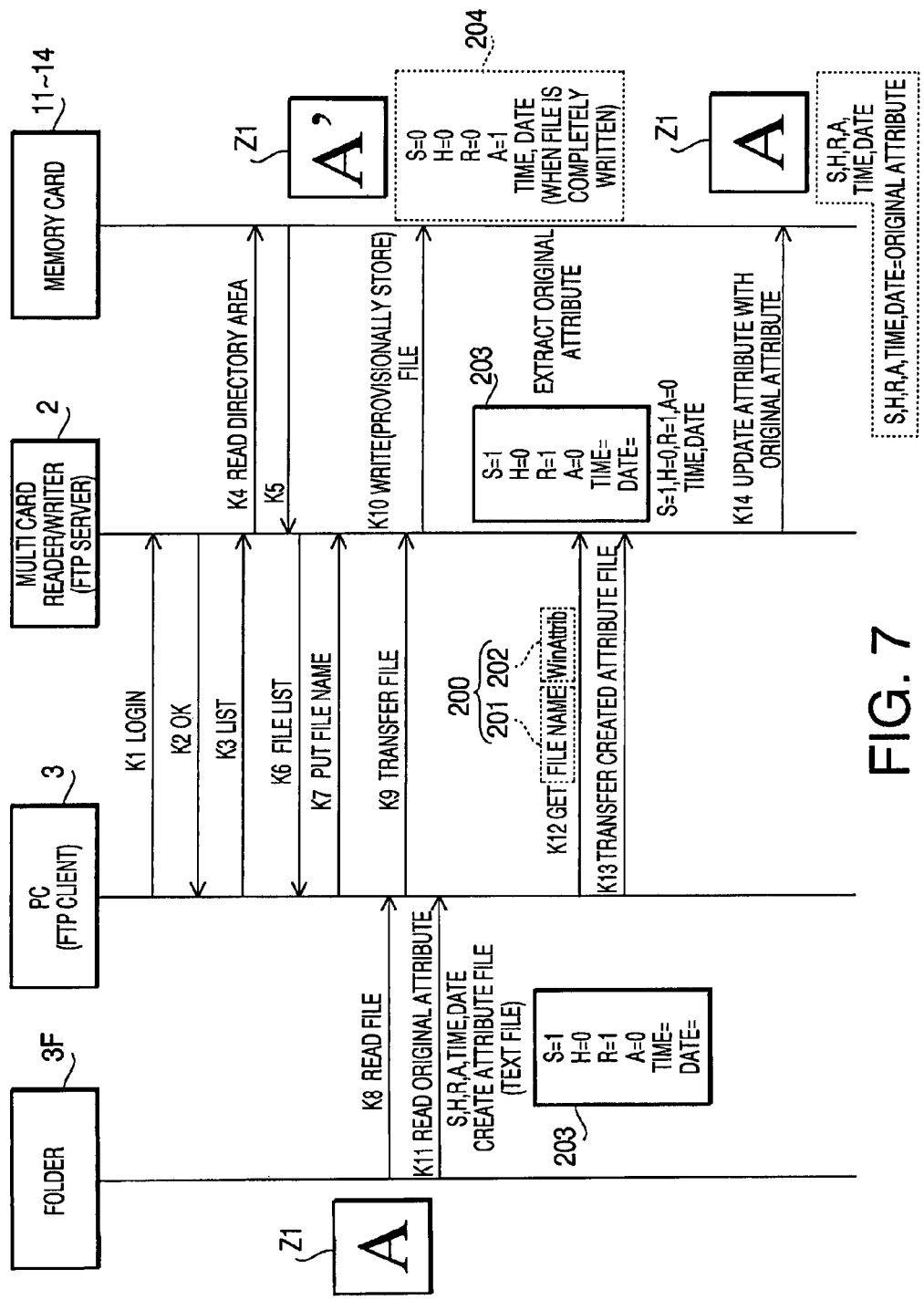
FIG. 7 is a sequence chart schematically showing a procedure of a file transfer process from the multi card reader/writer (FTP server) to the PC (FTP client) in accordance with one or more aspects of the present invention.

In order to update the predetermined format of attribute information 204 as provisionally stored of the data file with the original attribute information 205, an attribute saving program is installed in each of the printer 80 and PC 3. The following functions are actualized on the FTP communication system with the attribute saving program working in cooperation with the FTP server program and FTP client program. Hereinafter, an explanation on the functions will be given with reference to sequence charts schematically shown in FIGS. 6 and 7 (FIG. 6: multi card reader/writer 2→PC 3, FIG. 7: PC 3→multi card reader/writer 2). It is noted that characters "J" and "K" in FIGS. 6 and 7 are prefixes placed in front of step numbers in respective sequences shown in FIGS. 6 and 7.

<Multi Card Reader/Writer 2→PC 3>

Figure 5:
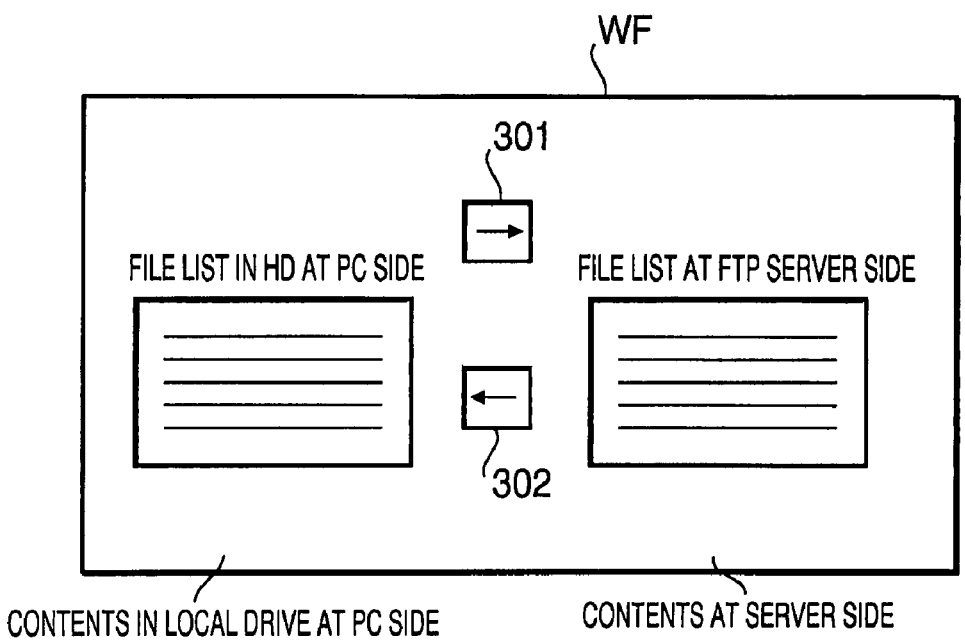
FIG. 5 is an example of a display image on a window displayed while FTP file transfer software is executed in accordance with one or more aspects of the present invention.

Function of issuing an actual file request command: The PC 3 (host device) issues, to the multi card reader/writer 2 (network storage device), an actual GET command (FTP file request command) that specifies a requested data file Z1 with an actual file name 201 of the data file Z1 (FIG. 6: J7). Specifically, the PC 3 logs onto the printer 80 (multi card reader/writer 2) (FIG. 6: J1, J2), and then issues a LIST command (FIG. 6: J3). The multi card reader/writer 2 reads a directory area in the memory card 11-14 (FIG. 6: J4, J5) and transfers a file list to the PC 3 (FIG. 6: J6). At the PC 3 side, a user runs software for the FTP file transfer. Then, there are displayed in a window WF on a monitor of the PC 3 a file list at the side of the local drive 3L of the PC 3 and a file list at the side of the FTP server (a memory card inserted in the multi card reader/writer 2) (see FIG. 5). Then, the user selects a file name of a file to be transferred (the selected file name is the "actual file name"), and a file transfer operation is started by clicking one of transfer direction buttons 301 and 302. The GET command is specified by clicking the button 302 that designates a transfer direction from the FTP server (multi card reader/writer 2) to the PC 3. It is noted that the software for the FTP file transfer may be browser software such as Internet Explorer (trademark registered), yet there is employed in the embodiment a program dedicated to FTP file exchange (a function of the program may be incorporated into the aforementioned attribute saving program).

Function of data file transfer at the storage device side: The multi card reader/writer 2 (network storage device) analyzes whether the GET command received from the PC 3 (host device) is the actual GET command. When the GET command received from the PC 3 is the actual GET command, the multi card reader/writer 2 reads out the requested data file Z1 specified by the actual file name 201 included in the GET command (FIG. 6: J8 and J9), and transfers the requested data file Z1 to the PC 3 (host device) based on the FTP (FIG. 6: J10). The data file Z1, to which the predetermined format of attribute information 204 is added at the PC 3, is once stored in the local drive 3L (FIG. 6: J11).

Function of issuing a virtual file request command: The PC 3 (host device) issues, to the multi card reader/writer 2 (network storage device), a virtual GET command that specifies a predetermined virtual attribute request file name 200 in response to the requested data file Z1 having been received (FIG. 6: J12). The process J12 is not performed based on a user input of the virtual attribute request file name 200 into the browser software but automatically performed by the attribute saving program based on an assumption that the GET command including the actual file name 201 has previously been issued.

Function of transferring an attribute file at the storage device side: The multi card reader/writer 2 (network storage device) analyzes whether the GET command received from the PC 3 (host device) is the virtual GET command. When the GET command received from the PC 3 is the virtual GET command, the multi card reader/writer 2 reads out the original attribute information 205 of the requested data file Z1 stored on the memory card 11-14 (FIG. 6: J13 and J14). Then, the multi card reader/writer 2 creates an attribute file 203 with the original attribute information 205 included therein and transfers the attribute file 203 (text file) to the PC 3 (host device) based on the FTP (FIG. 6: J15).

Function of storing a data file at the host device side: The PC 3 (host device) receives the attribute file 203 transmitted in response to the issued virtual GET command. Then, the PC 3 reads out the original attribute information 205 from the attribute file 203, and stores the requested data file Z1 with the original attribute information 205 being added thereto in the local drive 3L. Specifically, the predetermined format of attribute information 204 of the requested data file as provisionally stored is updated with the original attribute information 205. Further, the date and time information included in the predetermined format of attribute information 204 of the requested data file Z1 is updated with the date and time information included in the original attribute information 205 (FIG. 6: J16).

<PC 3→Multi Card Reader/Writer 2>

Function of issuing the actual file transfer command: It is a function provided at the PC 3 side, in which the PC 3 (host device) issues, to the multi card reader/writer 2 (network storage device), an actual PUT command (FTP file transfer command) that specifies the transferred data file Z1 with the actual file name 201 of the data file Z1 (FIG. 7: K7). Specifically, the PC 3 logs onto the printer 80 (multi card reader/writer 2) (FIG. 7: K1, K2), and then issues a LIST command (FIG. 7: K3). The multi card reader/writer 2 reads a directory area in the memory card 11-14 (FIG. 7: K4, K5) and transfers a file list to the PC 3 (FIG. 7: K6). The PUT command is specified by clicking the button 301 that designates a transfer direction from the PC 3 to the FTP server (multi card reader/writer 2) on the aforementioned window WF (see FIG. 5).

Function of data file transfer at the host device side: It is a function provided at the PC 3 (host device) side, in which when the issued PUT command is an actual PUT command, the PC 3 reads out the transferred data file Z1 specified by the actual file name 201 included in the PUT command from the local drive 3L (FIG. 7: K8) and transfers the transferred data file Z1 to the multi card reader/writer 2 (network storage device) based on the FTP (FIG. 7: K9). The multi card reader/writer 2 once stores the data file Z1 with the predetermined format of attribute information 204 being added thereto in the memory card 11-14 (FIG. 7: K10).

Function of issuing a virtual FTP file transfer command: It is a function provided at the PC 3 (host device) side, in which the PC 3 issues, to the multi card reader/writer 2 (network storage device), a virtual PUT command that specifies the predetermined virtual attribute request file name 200 in response to the transferred data file Z1 having been transferred (FIG. 7: K12). The process K12 is not performed based on the user input of the virtual attribute request file name 200 into the browser software but automatically performed by the attribute saving program based on an assumption that the PUT command including the actual file name 201 has previously been issued.

Function of transferring the attribute file at the host device side: It is a function provided at the PC 3 (host device) side, in which when the issued PUT command is the virtual PUT command, the PC 3 transfers the attribute file 203 (text file) as previously created with the original attribute information 205 included therein to the multi card reader/writer 2 (network storage device) based on the FTP (FIG. 7: K13). Here, after reading out and transferring the transferred data file Z1, the attribute saving program provided at the PC 3 side reads out the original attribute information 205 of the transferred data file Z1 stored in the local drive 3L and creates the attribute file 203 with the original attribute information 205 included therein (FIG. 7: K11) prior to issuing the virtual PUT command. This is because it is previously known at the stage (K7) where the actual PUT command is issued that an attribute saving process will be performed (K11-K14). Thereby, the attribute file 203 can be transferred (FIG. 7: K13) immediately after the virtual PUT command is issued (FIG. 7: K12).

Function of storing the data file at the storage device side: It is a function provided at the multi card reader/writer 2 (network storage device) side, in which the multi card reader/writer 2 reads out the original attribute information 205 from the received attribute file 203 and writes the transferred data file Z1 with the original attribute information 205 added thereto into the memory card 11-14. Specifically, the predetermined format of attribute information 204 of the transferred data file as provisionally stored is updated with the original attribute information 205 (FIG. 7: K14). In addition, the date and time information included in the predetermined format of attribute information 204 of the transferred data file as provisionally stored is updated with the date and time information included in the original attribute information 205.

It is noted that the virtual attribute request file name 200 includes an attribute request identifying character string 202 (":WinAttrib" in the embodiment) specific to itself, which is not included in the actual file name 201. Therefore, it is judged whether a file name is the virtual attribute request file name 200 based on whether the attribute request identifying character string is detected from the file name. It is also noted that the virtual attribute request file name 200 includes a character string of the actual file name 201 of a corresponding data file, and that the attribute file 203 includes the original attribute information 205 of a data file specified by the actual file name 201 included in the virtual attribute request file name 200.

The attribute request identifying character string 202 includes a character (concretely, ":") that is forbidden to be used on the file system of the OS. In the embodiment, the attribute request virtual file name 200 including the forbidden character is not actually added to the attribute file 203. The attribute file 203 is created as a temporary file to which there is added another predetermined file name (such as "abcd.txt" that is a file name created without a forbidden character) that can mutually be recognized between both the attribute storing programs at the PC 3 side and at the printer 80 (multi card reader/writer 2) side. The attribute saving process performed after issuing the actual GET command or actual PUT command is independently performed by both the attribute storing programs. Therefore, even though the attribute file 203 is created with a file name different from the virtual attribute request file name 200 specified by one of the attribute storing programs, there is caused no problem when the other attribute storing program, which receives the file name, accepts the file name. Further, since it is not checked in the FTP-based data communication whether a data file is transferred with a file name specified by a command, any unconformity is not caused on the protocol.

Figure 8:
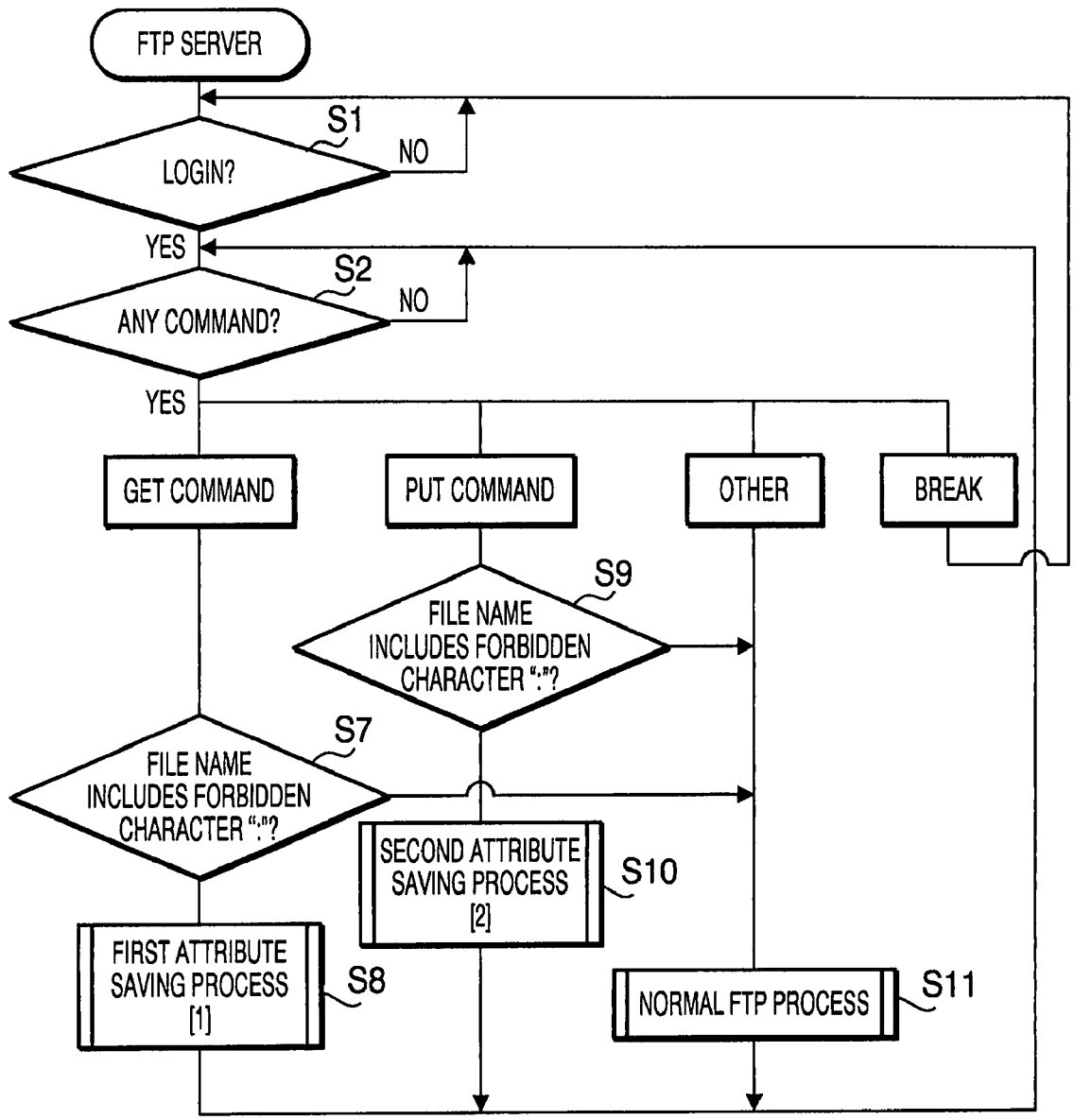
FIG. 8 is a flowchart showing a procedure of a process performed at the FTP server side in accordance with one or more aspects of the present invention.

Hereinafter, a procedure of a process in the communication system 1 will be described with reference to flowcharts. FIG. 8 shows a procedure of a process performed at the FTP server (printer 80, multi card reader/writer 2) side. The FTP server keeps waiting ready until the FTP client (PC 3) logs thereon in a step S1. Further, the FTP server keeps waiting ready until it receives a command in a step S2, and it is determined depending on a kind of the received command what kind of process is to be performed. When the received command is the GET command (S2: GET), the process goes to a step S7, in which it is judged whether the file name specified by the command includes the forbidden character such as ":" (colon). Unless it is judged that the file name includes the forbidden character such as ":" (S7: No), the process goes to a step S11, in which a normal FTP process is performed for the requested data file. Namely, the FTP server receives the requested data file from the PC 3 and adds the predetermined format of attribute information 204 to the received data file, provisionally storing the data file with the predetermined format of attribute information 204 added thereto in the memory card. Thereafter, the process goes back to the step S2.

Figure 9:
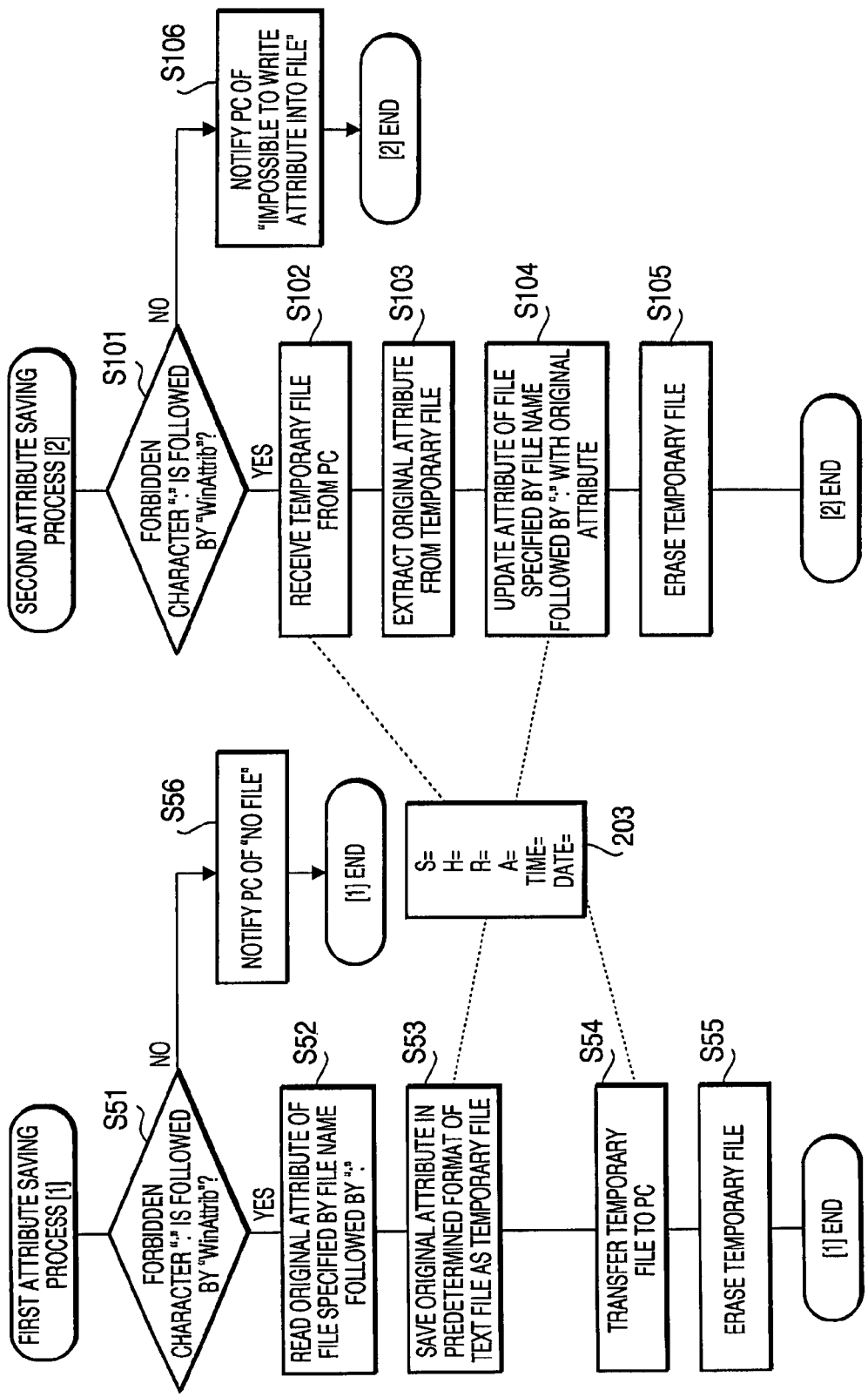
FIG. 9 is a flowchart showing a first attribute saving process and second attribute saving process in accordance with one or more aspects of the present invention.

Meanwhile, when it is judged that the file name includes the forbidden character such as ":" (S7: Yes), the process goes to a step S8, in which a first attribute saving process [1] shown in FIG. 9 is performed. After the first attribute saving process is completed, the process goes back to the step S2. FIG. 9 shows a detailed procedure of the first attribute saving process [1]. In the first attribute saving process, firstly in a step S51, it is judged whether a portion following the forbidden character ":" in the file name is a character string that includes a meaning of "attribute file creation" (in this case, "WinAttrib"). Unless it is judged that a portion following the forbidden character ":" is a character string that includes a meaning of "attribute file creation" (S51: No), the process goes to a step S56, in which the FTP server notifies the PC 3 of "NO FILE". Thereafter, the process goes back to the step S2 out of the first attribute saving process [1].

Meanwhile, when it is judged that a portion following the forbidden character ":" is a character string that includes a meaning of "attribute file creation" (S51: Yes), the process goes to a step S52, in which the FTP server specifies a requested data file with a file name indicated by a character string followed by the forbidden character ":" and reads the original attribute information 205 included in the specified data file. Thereafter, in a step S53, the FTP server saves contents of the original attribute information 205 in the attribute file 203 (temporary file as a text file). Then, after transferring the attribute file 203 to the PC 3 in a step S54, the FTP server erases the attribute file 203 (temporary file) in a step S55.

Referring back to FIG. 8, when the command received in the step S2 is the PUT command (S2: PUT), the process goes to a step S9, in which it is judged whether a file name specified by the command includes the forbidden character ":". Unless it is judged that a file name specified by the command includes the forbidden character ":" (S9: No), the process goes to the step S11, in which the normal FTP process is performed for the requested data file. Namely, the FTP server receives the requested data file from the PC 3 and adds the predetermined format of attribute information 204 to the received data file, provisionally storing the data file with the predetermined format of attribute information 204 added thereto in the memory card. Thereafter, the process goes back to the step S2, in which the FTP server keeps waiting ready until a command is received.

Meanwhile, when it is judged that the file name includes the forbidden character ":" (S9: Yes), the process goes to a step S10, in which a second attribute saving process [2] shown in FIG. 9 is performed. In the second attribute saving process [2], firstly in a step S101, it is judged whether a portion following the forbidden character ":" in the file name is a character string that includes a meaning of "attribute file creation" (in this case, "WinAttrib"). Unless it is judged that a portion following the forbidden character ":" is a character string that includes a meaning of "attribute file creation" (S101: No), the process goes to a step S106, in which the FTP server notifies the PC 3 of "IMPOSSIBLE TO WRITE ATTRIBUTE INTO FILE". Thereafter, the process goes back to the step S2 out of the second attribute saving process [2].

Meanwhile, when it is judged that a portion following the forbidden character is a character string that includes a meaning of "attribute file creation" (S101: Yes), the process goes to a step S102, in which the FTP server receives, from the PC 3, the attribute file 203 (temporary file) corresponding to a transferred data file with a file name represented by a character string followed by the forbidden character ":". Thereafter, in a step S103, the FTP server reads the original attribute information 205 from the attribute file 203 (temporary file as a text file). Then, after updating the predetermined format of attribute information 204 of the transferred data file stored on the memory card with the original attribute information in a step S104, the FTP server erases the attribute file 203 (temporary file) in a step S105.

Figure 10:
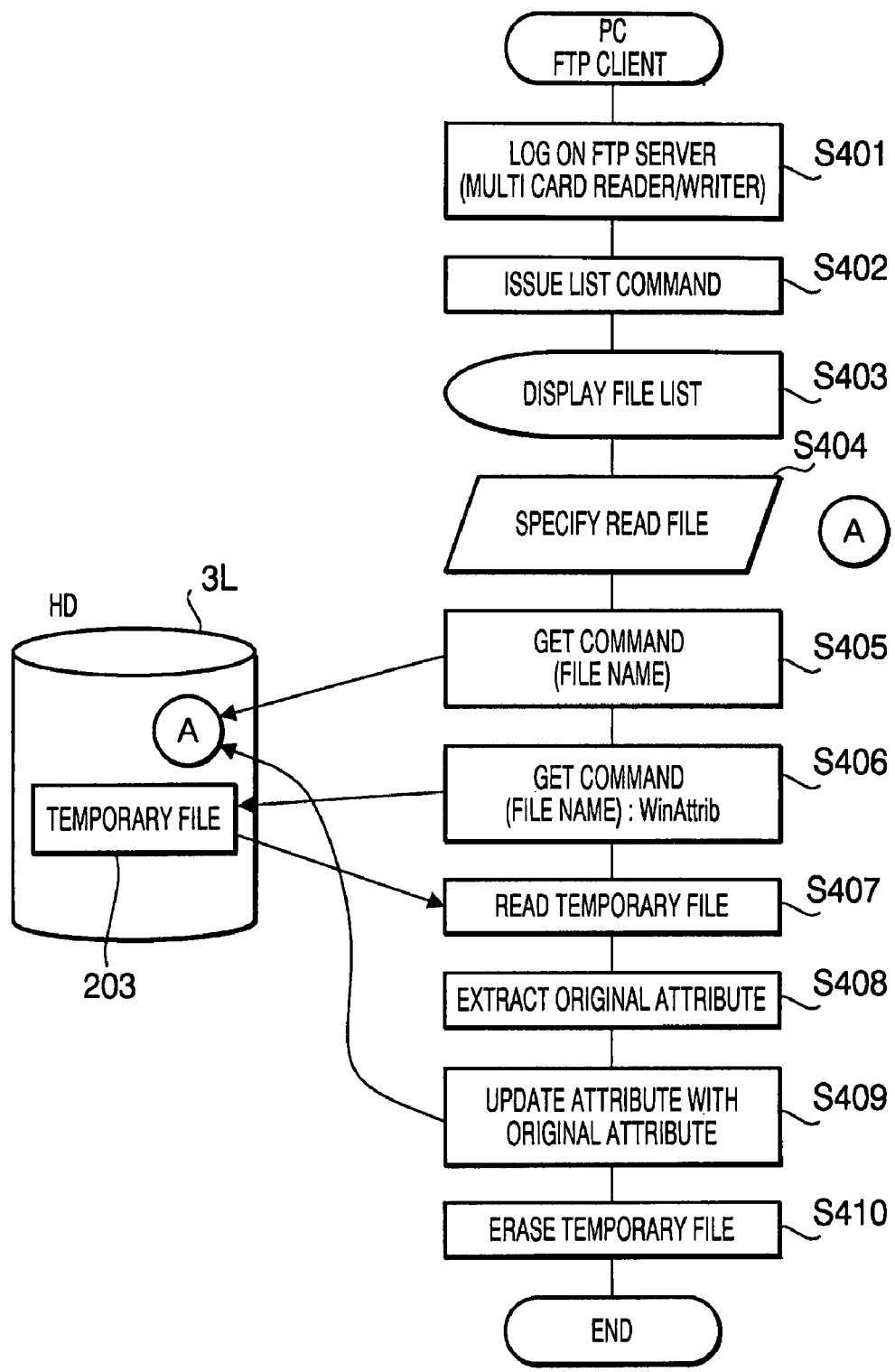
FIG. 10 is a flowchart showing a procedure of a process performed at the PC side that corresponds to the sequence chart shown in FIG. 6 in accordance with one or more aspects of the present invention.

FIG. 10 is a flowchart showing a procedure of a process executed at the PC 3 side that corresponds to the first attribute saving process [1]. The PC 3 logs on the FTP server (printer 80, multi card reader/writer 2) in a step S401, and issues the LIST command in a step S402. Then, the PC 3 displays the file list obtained from the multi card reader/writer 2 in a step S403, and specifies a read file (requested data file [A]) according to a user's input in a step S404. Subsequently, the PC 3 issues the GET command with the specified (actual) file name in a step S405, and issues the virtual GET command for requiring the attribute file 203 in a step S406. Then, the PC 3 received the attribute file 203 created by the FTP server in a step S407, and reads out the original attribute information 205 from the attribute file 203 in a step S408. Thereafter, the PC 3 updates the predetermined format of attribute information 204 of the requested data file [A] with the original attribute information 205 in a step S409, and erases the attribute file 203 in a step S410. The process is then terminated. The aforementioned series of steps make it possible to have a copy of the requested data file at the PC 3 side with the original attribute information 205 of the requested data file being maintained as it is even when the requested data file is transferred from the FTP server based on the FTP.

Figure 11:
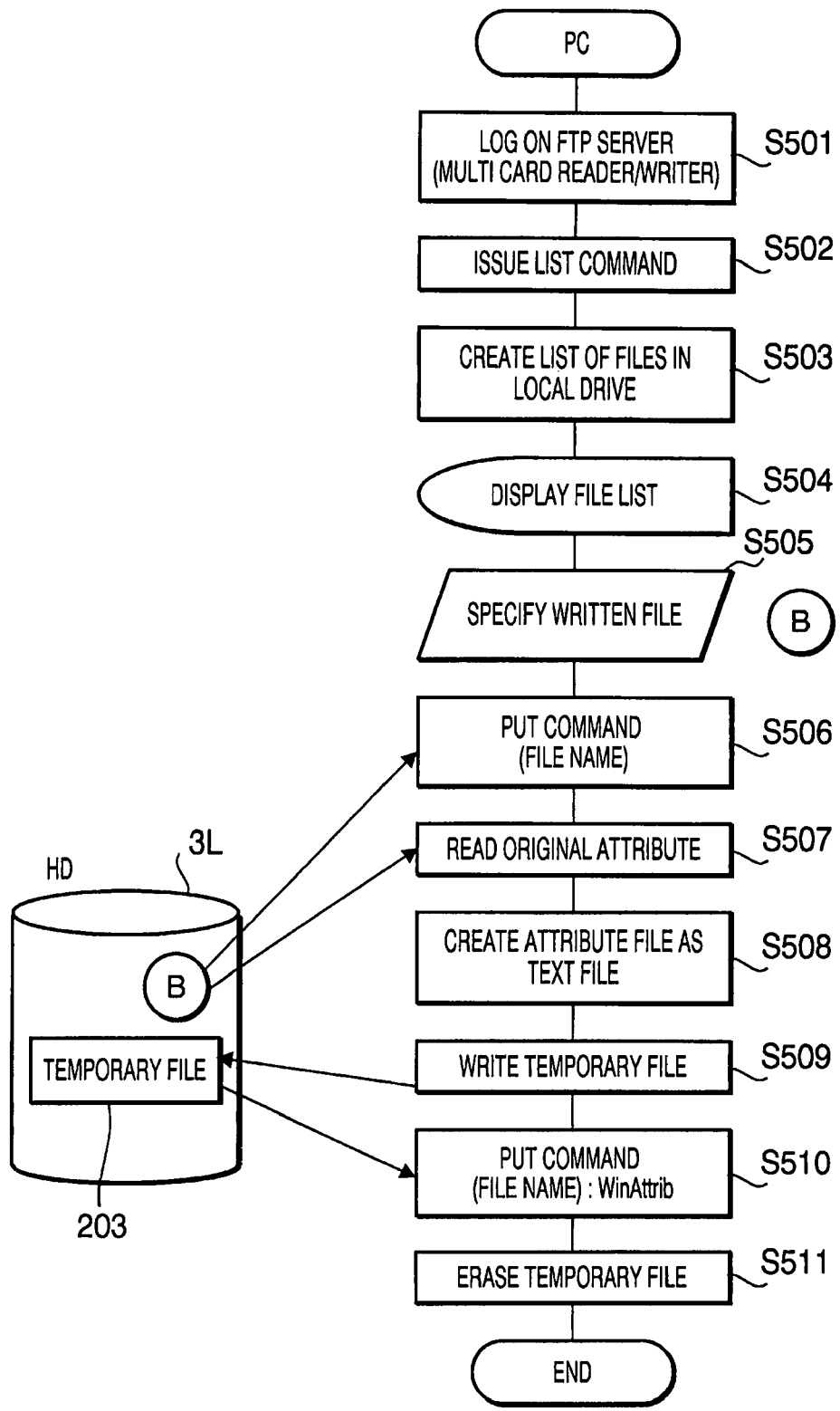
FIG. 11 is a flowchart showing a procedure of a process performed at the PC side that corresponds to the sequence chart shown in FIG. 7 in accordance with one or more aspects of the present invention.

FIG. 11 is a flowchart showing a procedure of a process executed at the PC 3 side that corresponds to the second attribute saving process [2]. The PC 3 logs on the FTP server (printer 80, multi card reader/writer 2) in a step S501, and issues the LIST command in a step S502. Then, the PC 3 creates the file list of the files stored in the local drive 3L in a step S503, and displays the file list in a step S504. Subsequently, the PC 3 specifies a written file (transferred data file [B]) according to a user's input in a step S505, and issues the PUT command with the specified (actual) file name in a step S506, reading out the original attribute information 205 included in the transferred data file [B] in a step S507. The attribute file 203 is created in a step S508 and once written into the local drive 3L in a step S509. Then, the PC 3 issues the virtual PUT command to transfer the attribute file 203 in a step S510, and erases the attribute file 203 in a step S511. The process is then terminated. The aforementioned series of steps make it possible to have a copy of the requested data file on the memory card inserted in the multi card reader/writer 2 with the original attribute information 205 of the transferred data file being maintained as it is even when transferring the file based on the FTP.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A communication system, comprising:
   a network;
   a host device connected with the network; and a network storage device connected with the network, the network storage device performing data communication with the host device via the network,
   wherein the host device includes:
   a data file request command issuing unit configured to issue, to the network storage device, a data file request command for requesting a data file stored in the network storage device, wherein the data file request command includes an actual file name specifying the requested data file;
   a data file receiving unit configured to receive the requested data file sent from the network storage device;
   a data file storing unit configured to store the requested data file received by the data file receiving unit;
   an attribute file request command issuing unit configured to issue, to the network storage device, an attribute file request command for requesting an attribute file including original attribute information of the requested data file, wherein the attribute file request command includes a virtual file name containing the actual file name specifying the requested data file and an attribute request identifying character string for identifying the attribute file request command;
   an attribute file receiving unit configured to receive the attribute file sent from the network storage device; and
   an attribute updating unit configured to update attribute information of the requested data file stored in the data file storing unit with the original attribute information included in the attribute file received by the attribute file receiving unit, and
   wherein the network storage device includes:
   a data file sending unit configured to read out the data file requested with the data file request command and send the requested data file to the host device, in response to the data file request command issued by the data file request command issuing unit;
   an attribute file creating unit configured to read out the original attribute information from the requested data file stored in the network storage device and create the attribute file including the original attribute information, in response to the attribute file request command issued by the attribute file request command issuing unit; and
   an attribute file sending unit configured to send the attribute file created by the attribute file creating unit to the host device.

2. The communication system according to claim 1, wherein the data file storing unit provisionally stores the requested data file with temporal attribute information added thereto as substitute for the original attribute information thereof, and
   wherein the attribute updating unit updates the temporal attribute information added to the requested data file with the original attribute information included in the attribute file received by the attribute file receiving unit.

3. The communication system according to claim 2, wherein the temporal attribute information includes information on a date and time when the requested data file has provisionally been stored in the data file storing unit.

4. The communication system according to claim 1, wherein the network storage device is provided in a printer, and
   wherein the network storage device is configured with a non-volatile memory, a memory card slot, and a memory card to be inserted into the memory card slot.

5. The communication system according to claim 1, wherein the network is configured as a TCP/IP-based network,
   wherein the host device is configured as an FTP client, and
   wherein the network storage device is configured as an FTP server.

6. A communication system, comprising:
   a network;
   a host device connected with the network; and
   a network storage device connected with the network, the network storage device performing data communication with the host device via the network,
   wherein the host device includes:
   a storage unit;
   a data file transfer command issuing unit configured to issue, to the network storage device, a data file transfer command specifying a data file stored in the storage unit, wherein the data file transfer command includes an actual file name specifying the data file;
   a data file sending unit configured to read out, from the storage unit, the data file specified by the data file transfer command and send the data file to the network storage device, in response to the data file transfer command being issued by the data file transfer command issuing unit;
   an attribute file transfer command issuing unit configured to issue, to the network storage device, an attribute file transfer command for sending an attribute file including original attribute information of the data file, wherein the attribute file transfer command includes a virtual file name containing the actual file name specifying the data file and an attribute transfer identifying character string for identifying the attribute file transfer command;
   an attribute file creating unit configured to read out the original attribute information from data file stored in the storage unit and create the attribute file including the original attribute information, in response to the attribute file transfer command being issued by the attribute file transfer command issuing unit; and an attribute file sending unit configured to send the attribute file created by the attribute file creating unit to the network storage device, and wherein the network storage device includes:

a data file receiving unit configured to receive the data file sent by the data file sending unit;

a data file storing unit configured to store the file received by the data file receiving unit;

an attribute file receiving unit configured to receive the attribute file sent by the attribute file sending unit; and an attribute updating unit configured to update attribute information of the data file stored in the data file storing unit with the original attribute information included in the attribute file received by the attribute file receiving unit.

7. The communication system according to claim 6, wherein the data file storing unit provisionally stores the data file with a temporal attribute information added thereto as substitute for the original attribute information thereof, and wherein the attribute updating unit updates the temporal attribute information added to the data file with the original attribute information included in the attribute file received by the attribute file receiving unit.

8. The communication system according to claim 7, wherein the temporal attribute information includes information on a date and time when the data file has provisionally been stored in the data file storing unit.

9. The communication system according to claim 6, wherein the network storage device is provided in a printer, and wherein the network storage device is configured with a non-volatile memory, a memory card slot, and a memory card to be inserted into the memory card slot.

10. The communication system according to claim 6, wherein the network is configured as a TCP/IP-based network, wherein the host device is configured as an FTP client, and wherein the network storage device is configured as an FTP server.

* * * * *